(12) United States Patent
Licht et al.

(10) Patent No.: US 10,829,031 B2
(45) Date of Patent: Nov. 10, 2020

(54) MOTOR VEHICLE HEADLAMP ASSEMBLY

(71) Applicant: Marelli Automotive Lighting Reutlingen (Germany) GmbH, Reutlingen (DE)

(72) Inventors: Martin Licht, Reutlingen (DE); Christian Buchberger, Reutlingen (DE); Joachim Knittel, Reutlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 16/041,752

(22) Filed: Jul. 21, 2018

(65) Prior Publication Data

US 2019/0039502 A1    Feb. 7, 2019

(30) Foreign Application Priority Data

Aug. 3, 2017    (DE) .................. 10 2017 117 591

(51) Int. Cl.
*B60Q 1/00*    (2006.01)
*G01S 7/481*    (2006.01)
(Continued)

(52) U.S. Cl.
CPC ............ *B60Q 1/0023* (2013.01); *F21S 41/00* (2018.01); *G01S 7/481* (2013.01); *G01S 17/42* (2013.01);
(Continued)

(58) Field of Classification Search
CPC .... G01S 17/89; G01S 17/936; G01S 17/4814; G01S 17/42; G01S 7/481; G01S 2013/9396; B60Q 1/0023; F21S 41/00
See application file for complete search history.

(56) References Cited

U.S. PATENT DOCUMENTS 6,688,758 B2 *   2/2004   Thibault ................. G01B 11/25
                                                                   235/454
7,350,945 B2 *   4/2008   Albou .................. B60Q 1/0023
                                                                   362/231
(Continued)

FOREIGN PATENT DOCUMENTS

DE          19615732 A1      10/1997
DE          19731754 A1       2/1999
(Continued)

OTHER PUBLICATIONS

Search Report for German Patent Application No. 10 2017 117 591.1 dated Jan. 23, 2018.
(Continued)

*Primary Examiner* — Arman B Fallahkhair
(74) *Attorney, Agent, or Firm* — Howard & Howard Attorneys PLLC

(57) ABSTRACT

A headlamp assembly for a motor vehicle comprising at least one headlamp, which has a light source for emitting visible light, a radiation source for emitting infrared radiation, and a light emission optics with a light entry surface, which visible light from the light source and infrared radiation from the radiation source strikes, and which has an optical exit-deflection element, which directs the infrared radiation from the radiation source toward the light entry surface of the light emission optics. The optical exit-deflection element comprises at least one optics, which broadens the infrared radiation emitted by the radiation source to form a radiation beam with a cross section broadened in a horizontal plane (HH), and a radiation distribution that has at least one intensity maximum disposed toward the edge in the radiation distribution, to one side of a vertical plane (VV), when viewed in a focal plane of the light emission optics.

20 Claims, 6 Drawing Sheets

(51) Int. Cl.
*F21S 41/00* (2018.01)
*G01S 17/42* (2006.01)
*G01S 17/931* (2020.01)
*G01S 17/89* (2020.01)
*G01S 13/931* (2020.01)

(52) U.S. Cl.
CPC ............ *G01S 17/931* (2020.01); *G01S 17/89* (2013.01); *G01S 2013/93277* (2020.01)

(56) References Cited

U.S. PATENT DOCUMENTS

| | | | | |
|---|---|---|---|---|
| 7,527,405 | B2* | 5/2009 | Tatsukawa | ............... F21S 41/13 362/538 |
| 7,654,714 | B2* | 2/2010 | Mochizuki | ........... B60Q 1/0041 362/539 |
| 8,292,479 | B2* | 10/2012 | Sazuka | ................... F21V 29/74 362/511 |
| 2003/0072167 | A1* | 4/2003 | Albou | .................. B60Q 1/0041 362/543 |
| 2003/0223246 | A1* | 12/2003 | Albou | ..................... B60Q 1/14 362/539 |
| 2004/0042325 | A1* | 3/2004 | Ashizawa | ............. G11C 11/419 365/232 |
| 2004/0240219 | A1* | 12/2004 | Oishi | ...................... F21S 41/18 362/487 |
| 2009/0196060 | A1* | 8/2009 | Sazuka | .................... B60Q 1/14 362/509 |
| 2013/0265561 | A1* | 10/2013 | Takahira | .................. F21V 7/06 356/3 |
| 2014/0042325 | A1* | 2/2014 | Yamamura | ............ F21S 41/147 250/347 |
| 2014/0169010 | A1* | 6/2014 | Imaeda | .................. B60Q 1/143 362/460 |

FOREIGN PATENT DOCUMENTS

| | | |
|---|---|---|
| DE | 102007048681 A1 | 4/2009 |
| DE | 102009045553 A1 | 4/2011 |
| DE | 102014009860 A1 | 1/2016 |
| EP | 0802082 A2 | 10/1997 |
| WO | 2016000800 A1 | 1/2016 |

OTHER PUBLICATIONS

Communication for European Patent Application No. 18187271.4 dated Jan. 3, 2019.

* cited by examiner

MOTOR VEHICLE HEADLAMP ASSEMBLY

CROSS-REFERENCE TO RELATED APPLICATIONS

The present claims priority to and all the benefits of German Patent Application No. 10 2017 117 591.1, filed on Aug. 3, 2017, which is hereby expressly incorporated herein by reference in its entirety.

BACKGROUND OF THE INVENTION

1. Field of the Invention

The present invention relates to a motor vehicle headlamp assembly comprising at least one headlamp. The at least one headlamp has a light source for emitting visible light, at least one radiation source for emitting infrared radiation, and a light emission optics that has a light entry surface. Visible light from the light source and invisible infrared radiation from the at least one radiation source strike the light entry surface of the light emission optics. Furthermore, the at least one headlamp has at least one optical exit-deflection element, which directs the infrared radiation emitted by the at least one radiation source to the light entry surface of the light emission optics.

2. Description of the Related Art

A headlamp for such a headlamp assembly for a motor vehicle is known, for example, from U.S. Pat. No. 7,350,945 B2. The infrared radiation components are used therein to determine distances to objects located in front of the motor vehicle that reflect infrared radiation, among other things. Distance determination using infrared radiation is also referred to as "light detection and ranging," abbreviated as "LiDAR." An infrared radiation detector is disposed in each headlamp in the known headlamps, wherein a detector beam path does not pass through the light emission optics.

A distance to an object in front of the motor vehicle is determined with LiDAR in that, e.g. the runtime of an infrared radiation pulse that has been emitted from a radiation source of a headlamp, reflected by the object and received by an infrared detector is measured. Know LiDAR systems are usually separate modules at present, which must be disposed in the motor vehicle in addition to the headlamps. The integration of a LiDAR system in a light module of a motor vehicle headlamp is known exclusively from the aforementioned U.S. Pat. No. 7,350,945 B2.

One problem with known LiDAR systems is that the backscattering cross section from illuminated objects in the center in front of the motor vehicle is significantly larger than from objects located in the lateral regions in front of the motor vehicle. The backscattering cross section thus decreases toward the edges. Therefore, with objects located at an angle in front of the motor vehicle, or the headlamp, respectively, the signal of the radiation reflected back from the object is weaker. The reason for this is the diagonal angle of incidence of the emitted infrared radiation. The backscattering signal of a conventional LiDAR system decreases with the angle of incidence, and is thus weaker for objects at the side of the road. The signal becomes weaker according to the so-called $\cos^4$ law. As a result, it is more difficult to detect objects located to the side, and the detection is less precise.

SUMMARY OF THE INVENTION

Based on the prior art described above, the fundamental object of the invention is to create and further develop a motor vehicle headlamp of the type specified in the introduction, such that objects located to the side or diagonally in front of the vehicle can be better detected, or detected as well as objects located in directly in front of the vehicle.

To achieve this object, starting from the motor vehicle headlamp specified in the introduction, it is proposed that the optical exit-deflection element comprises at least one optics, which broadens the infrared radiation emitted by the at least one radiation source to form a beam with an enlarged cross section in the horizontal plane and a beam distribution that has an intensity maximum located to one side of a vertical plane, toward the edge of the beam distribution viewed in a focal plane of the light emission optics. The light emission optics is designed as a projection lens, by way of example.

It is particularly preferred when the at least one radiation source emits pulsed infrared radiation. At least one infrared radiation pulse is emitted toward the foreground in front of the motor vehicle in order to detect persons and objects in this foreground. A distance to the person or object in front of the motor vehicle is determined in that, e.g. the runtime of an infrared radiation pulse is measured, which has been emitted from a radiation source, reflected by the person or object, and received by at least one infrared detector. Such systems are also referred to as LiDAR systems.

With the headlamp that has the integrated LiDAR system according to the invention, the infrared radiation emitted from the radiation source of the LiDAR system is broadened by an optics, such that a beam distribution is generated in the focal plane of the light emission optics such that the intensity increases horizontally toward the edges. The increase in intensity is such that the backscattering cross section from illuminated objects decreasing toward the edges can at least be partially compensated for. This has the advantage that objects located diagonally in front of the vehicle toward the side of the beam distribution where the maximum intensity is located can be detected better, or just as well as objects located in front of the vehicle, in the center of the beam distribution.

Each of the headlamps preferably has a free-form optics or a hologram, which projects the beam distribution of the at least one broadened beam into the focal plane of the light emission optics. The radiation source is preferably formed by an IR laser diode that emits coherent, strongly focused light. In each case, one of the radiation sources of a headlamp forms a LiDAR source with the dedicated optical exit-deflection element for a LiDAR system integrated in the headlamp.

To enable an improved detection of objects that are located diagonally to the left in front of the vehicle, as well as objects that are located diagonally to the right in front of the vehicle, it is advantageous when the resulting radiation distribution has an intensity maximum on each side (right and left) with respect to the vertical plane. Such a radiation distribution with two intensity maximums can be obtained, by way of example, in that the motor vehicle headlamp assembly comprises two headlamps, which are located on different sides of the motor vehicle. The optical exit-deflection element of the one headlamp broadens the infrared radiation emitted by the at least one radiation source of the one headlamp to form a beam with an enlarged cross section in the horizontal plane, and an asymmetrical radiation distribution that has an intensity maximum located toward the edge of the radiation distribution on a first side of the vertical plane when viewed in a focal plane of the light emission optics. The optical exit-deflection element of the other headlamp broadens the infrared radiation emitted by the at least one radiation source of the other headlamp to form a beam with an enlarged cross section in a horizontal plane, and an asymmetrical radiation distribution that has an intensity maximum located toward the edge of the radiation distribution on another side of the vertical plane when viewed in a focal plane of the light emission optics.

It is particularly preferred when each of the optical exit-deflection elements comprises at least one optics, which broadens the infrared radiation emitted by the at least one radiation source of the LiDAR system to form a beam with an enlarged cross section in a horizontal plane, and a radiation distribution that has two intensity maximums located on both sides of the vertical plane, toward the edges of the radiation distribution when viewed in a focal plane of the light emission optics. In this manner, objects located diagonally in front of the vehicle can be better detected on both sides. The two intensity maximums of the radiation distribution, located on opposite sides of a vertical plane, can be generated, e.g., by at least one diffraction grating, which is a component of an optical exit-deflection element of the LiDAR system. The diffraction grating is located in the beam path, downstream of the at least one optics element of the LiDAR system. The diffraction grating splits the radiation beam exiting the at least one optics element into two subsidiary radiation beams, each of which generates one of the intensity maximums.

Each of the headlamps in the motor vehicle headlamp assembly according to the invention preferably has at least one infrared radiation detector, which detects infrared radiation emitted by at least one of the radiation sources of the motor vehicle headlamp assembly and reflected by an object in front of the motor vehicle, and to generate a corresponding sensor signal.

According to an advantageous further development of the invention, it is proposed that the at least one headlamp have a plurality of infrared radiation detectors, each of which detects infrared radiation emitted by at least one of the radiation sources of the motor vehicle headlamp assembly, reflected by an object in front of the motor vehicle, and striking the infrared radiation detector within a specific angular range, and to generate a corresponding sensor signal. This is of interest in particular for headlamps that monitor the region directly in front of the vehicle at a close range. The radiation detector unit is not formed by an individual detector thereby, but instead comprises a plurality of spatially separate radiation detectors, disposed such that they can each detect light from a specific angular range, and then generate a measurement signal containing distance information and/or directional information.

The following embodiments regarding the width of beam cones of the infrared radiation beam emitted from the radiation source apply analogously to the detection cones of the infrared detectors. By broadening the detection cone, the close range can be better detected, and by focusing the detection cone, the long range can be better detected. Accordingly, the close range can be better illuminated with a broadened radiation cone, and the long range can be better illuminated by focusing the radiation cone, and thus ultimately better detected.

The radiation detectors each detect infrared radiation reflected by an object in a specific detection cone. In order to compensate for the reduced range with a broad detection cone, it is advantageous to provide LiDAR systems with different detection cones in the two headlamps of the headlamp assembly of a motor vehicle. Thus, by way of example, a very broad detection cone may be provided in one headlamp in order to better detect at close range, and a more focused detection cone may be provided in the other headlamp in order to better detect at long range with a greater range.

Advantageously, each optical exit-deflection element has a first optics, which broadens the infrared radiation emitted by the at least one radiation source to form an intermediate beam, and a further optics, which focuses the intermediate beam in comparison to the overall broadened beam of the infrared laser beam emitted by the radiation source of the LiDAR system.

It is conceivable for each headlamp to have a plurality of radiation sources and a plurality of optical exit-deflection element. Each optical exit-deflection element is dedicated to one of the radiation sources, and each radiation source generates its own broadened beam with its dedicated optical exit-deflection element, with the two outlying intensity maximums. The beams from the different radiation sources are broadened to different extents.

Beams of different widths can be created in the motor vehicle headlamp assembly, by way of example, in that a radiation source with a dedicated optical exit-deflection element for generating a focused beam is located in the left-hand headlamp, and a radiation source with a dedicated optical exit-deflection element for generating a broader beam in the horizontal plane, with the outlying intensity maximum in the horizontal plane, is located in the right-hand headlamp.

Alternatively, it is conceivable that a radiation source with a dedicated optical exit-deflection element for generating a focused beam is located in the right-hand headlamp, and a radiation source with a dedicated optical exit-deflection element for generating a broader beam in the horizontal plane is located in the left-hand headlamp. In this configuration, the beam of the focused radiation cone can also be used as a photo sensor for objects moving in front of the vehicle from the right-hand edge of the road. For this, the radiation cone is located as close to the side of the vehicle as possible, and comprises beams that are nearly parallel. It would even be possible for the radiation cone to be asymmetrical, in order to monitor a larger region in front of the vehicle with a photo sensor.

According to an advantageous embodiment of the invention, it is proposed that each headlamp have a plurality of radiation sources and a plurality of optical exit-deflection elements. One optical exit-deflection element is dedicated to one radiation source in each case. In interacting with the dedicated optical exit-deflection elements, the radiation sources each generate a portion of a collectively broadened beam that has the two outlying intensity maximums. The various radiation sources thus generate different radiation distributions in the high beam plane, which overlap the broadened beam that has the outlying intensity maximums located on each side of a vertical plane.

It is particularly preferred that the radiation sources can be activated depending on the driving circumstances of the motor vehicle. In this manner, with a plurality of radiation sources for each LiDAR system, an appropriate radiation source can be used to illuminate the preferred respective region in front of the vehicle.

According to an advantageous further development of the invention, it is proposed that the motor vehicle headlamp assembly comprise two headlamps, each of which is located on a different side of the motor vehicle. The at least one radiation source of the one headlamp is operated alternating with the at least one radiation source of the other headlamp. Each of the detectors in each of the headlamps detects infrared radiation reflected by the object, and conveys this to a further evaluation. It is thus possible to precisely determine the position of an object lying within the beams of the two headlamps by triangulation. The radiation cones also correspond approximately to the detection cones in the respective infrared detectors in the headlamps. Alternatively, it can also be concluded through an overlapping of the detection cones that the object located in both radiation cones is located directly in front of the vehicle.

Lastly, it is proposed that the at least one light source, the at least one radiation source, the at least one optical exit-deflection element, and the light emission optics of a headlamp are disposed on a collective support frame for a light module of the headlamp, which is dynamically supported in a housing of the headlamp.

BRIEF DESCRIPTION OF THE DRAWINGS

Further features and advantages of the present invention shall be explained below in greater detail based on various preferred exemplary embodiments with reference to the figures. Therein.

DETAILED DESCRIPTION OF THE INVENTION

Figure 1:
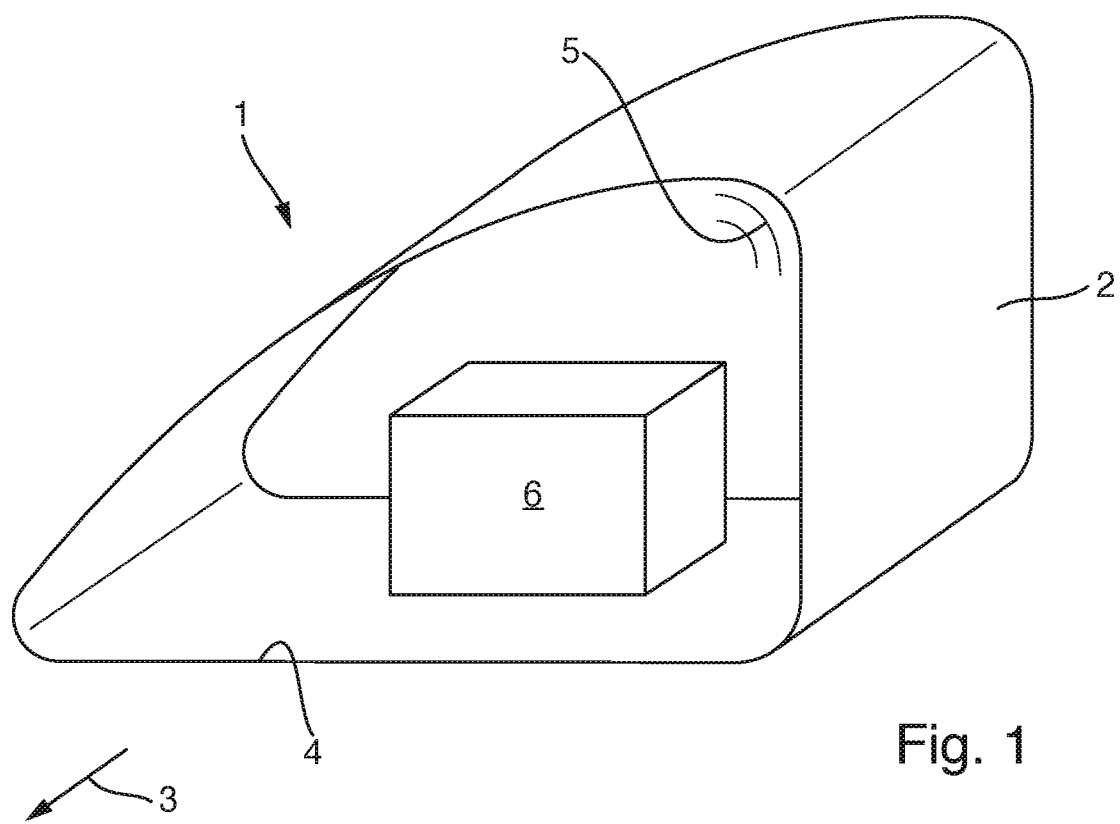
FIG. 1 shows a headlamp of a motor vehicle headlamp assembly according to the invention.

The present invention relates to a motor vehicle headlamp assembly that has at least one motor vehicle headlamp 1, as shown by way of example in FIG. 1. The headlamp 1 is disposed at an arbitrary location on the outside of a motor vehicle, preferably in a suitable installation opening in the front region of a motor vehicle. The motor vehicle preferably comprises two headlamps 1 disposed at a spacing to one another in the front region thereof, in particular a right-hand headlamp and a left-hand headlamp. The headlamp 1 generates predefined light distributions. The light distributions can fulfill arbitrary headlamp functions, e.g. low beams, high beams, fog lights and/or arbitrary adaptive light distributions (e.g. partial high beams).

The headlamp 1 comprises a housing 2, preferably made of a transparent material, in particular plastic. The housing 2 has a light emission opening 4 oriented in the direction of the light emission 3, which is closed by a cover plate 5. The cover plate 5 is made of a transparent material, e.g. glass or plastic. The cover plate 5 in this example does not have an optically effective element (e.g. cylindrical lenses or prisms) for diffracting the light passing through it. At least one light module 6 is located inside the housing 2, which shall be explained in greater detail below with reference to FIGS. 2 to 10b. The light module generates one or more light distributions of the headlamp 1, or a portion of the light distribution.

Figure 2:
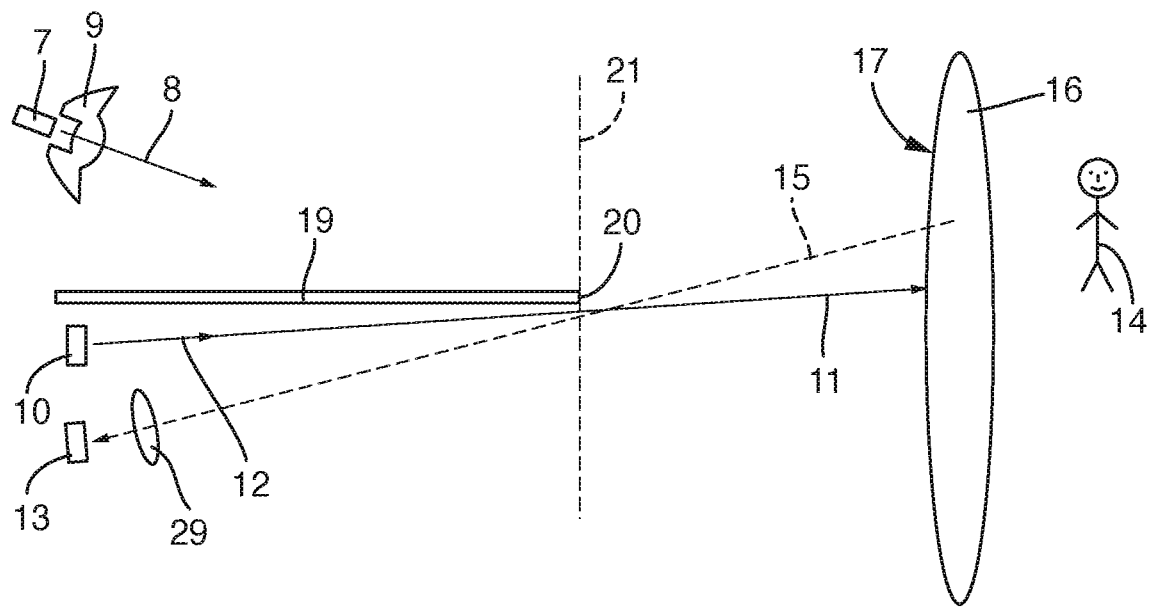
FIG. 2 shows an exemplary embodiment of a light module of the headlamp in FIG. 1.

A first preferred exemplary embodiment of the light module 6 is shown schematically and by way of example in FIG. 2 in the form of a so-called projection module. The light module 6 comprises a light source 7 for emitting visible light in a main beam direction 8. The light source 7 is formed by a semiconductor light source, in particular an LED. This emits light in the main beam direction 8 in a 180° half-space. The light source 7 can have a dedicated focusing optics, which concentrates the emitted light. The focusing optics in the example shown herein is formed by a focusing optics element made of a solid transparent material. The emitted light beams enter this focusing optics element via at least one entry surface thereof, are deflected therein, at least in part, at boundary surfaces of the focusing optics element by total reflection, and then exit the focusing optics element via an exit surface in the form of a light beam. The focusing of the light takes place thereby via diffraction at the light entry and light exit surfaces and through total reflection at the boundary surfaces. The light emitted by the light source 7 is used to generate the light distribution of the headlamp 1 or a portion thereof. In the example, the light is used to generate a low beam light distribution. The light module 6 also has a shutter element 19 for generating a horizontal light/dark boundary in the low beam light distribution, which is horizontal in this example, and has a substantially horizontal surface extension. The light/dark boundary is generated by mapping a front edge 20 of the shutter element 19 onto the roadway in front of the vehicle. The shutter element 19 preferably has a mirrored surface.

The light module 6 also has at least one radiation source 10 for emitting infrared radiation 11, invisible to the human eye, in a main beam direction 12. The radiation source 10 is preferably formed by an IR laser diode, which emits a coherent, strongly focused light. The light module 6 also has an infrared radiation detector 13, that detects infrared radiation 15 emitted by the radiation source 10 and reflected by an object 14 in front of the motor vehicle, and to generate a corresponding sensor signal. The light module 6 also comprises a light emission optics 16 that has a light entry surface 17, which the visible light from the light source 7 and the infrared radiation 11 from the radiation source 10 strikes. A focal plane of the light emission optics 16 is indicated by the reference symbol 21. The light emission optics 16 is formed by a projection lens here, which maps the light distribution in the focal plane 21 on the roadway in front of the vehicle.

An optical exit-deflection element 18 can be located in the beam path of the radiation source 10 (cf. FIG. 3), which directs the infrared radiation 11 emitted by the radiation source 10 onto the light entry surface 17 of the light emission optics 16. The infrared radiation components 10, 13, 18 are used to determine, among other things, distances to objects located in front of the motor vehicle that reflect infrared radiation, e.g. the object 14. Distance determination by infrared radiation 11 is referred to as "light detection and ranging," abbreviated as "LiDAR." In this regard, the infrared radiation components 10, 18 (so-called LiDAR source), together with the infrared radiation detector 13, form a so-called LiDAR system, which is integrated in the light module 6 in the example shown herein. The LiDAR system 10, 13, 18 is disposed in particular in the high beam portion of the projection module 6, i.e. beneath the horizontal shutter element 19. In contrast, the light generating components 7, 9 are located in the low beam portion of the projection module 6, i.e. above the horizontal shutter element 19.

Figure 3:
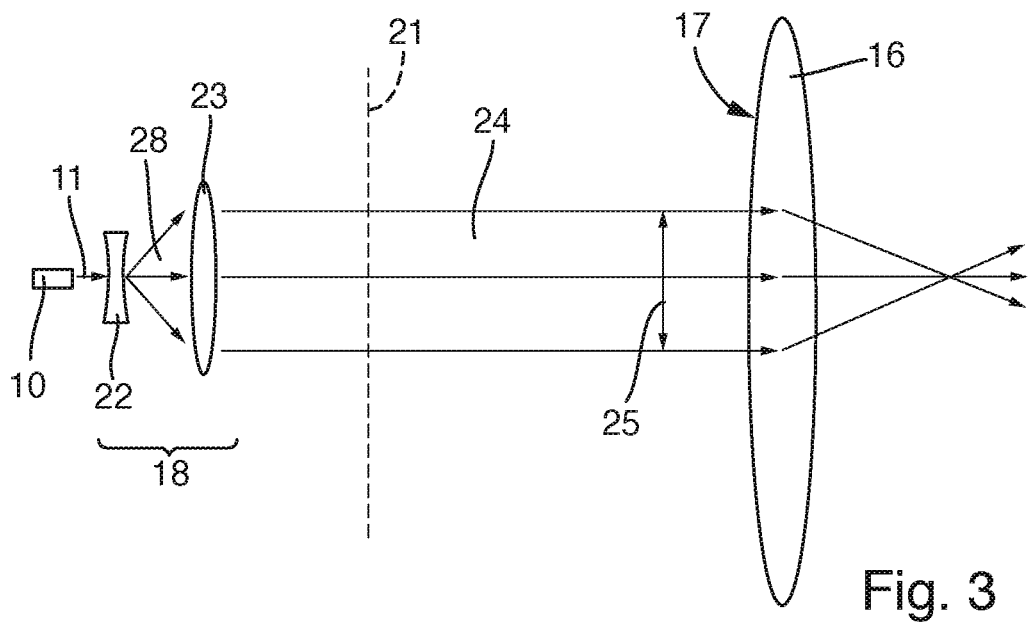
FIG. 3 shows an exemplary embodiment of a LiDAR system of the light module from FIG. 2.
Figure 4:
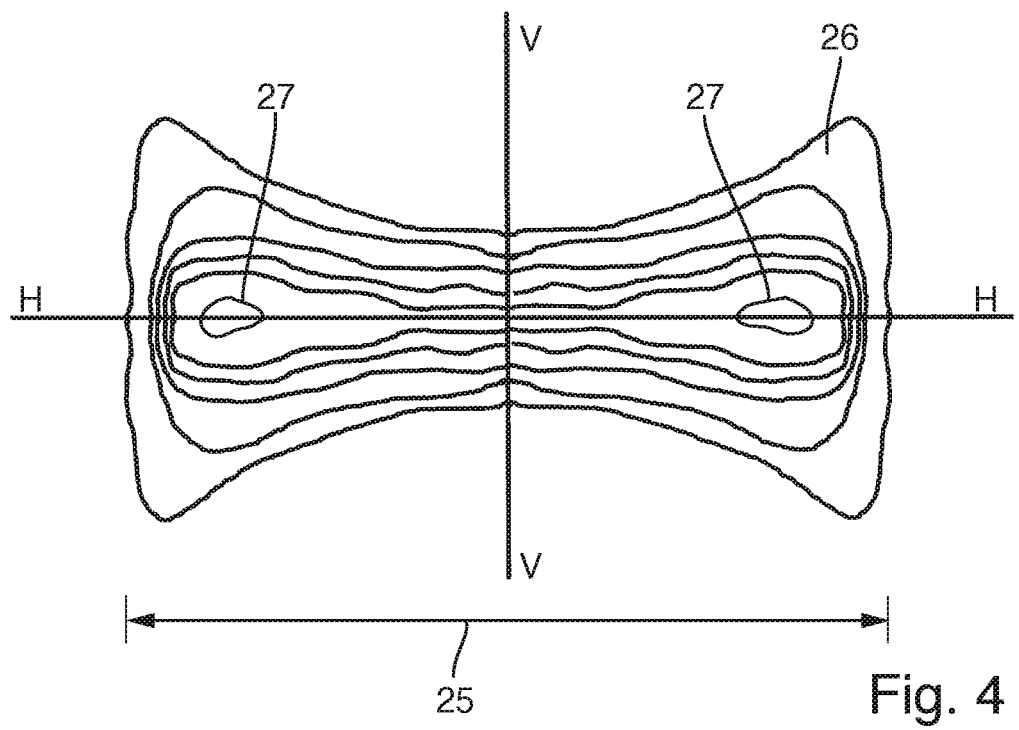
FIG. 4 shows an example of a radiation distribution of the LiDAR system from FIG. 3.

The light generating components 7, 9 in the low beam portion of the projection module 6 are not shown in FIG. 3. The illustration is limited to the LiDAR source 10, 18 of the LiDAR system 10, 13, 18 in the high beam portion of the projection module 6. It is proposed according to the invention that the optical exit-deflection element 18 comprises at least one optics 22, 23, which broadens the infrared radiation 11 emitted by the radiation source 10 to form a radiation beam 24 with an enlarged cross section 25 in the horizontal plane (cf. FIG. 3) and a radiation distribution 26 (cf. FIG. 4), which has at least one intensity maximum 27 toward the edge of the radiation distribution 26, located to one side of the vertical plane VV when seen in the focal plane 21 of the light emission optics 16. In the example shown in FIG. 4, the radiation distribution 27 has two intensity maximums 27, which are formed toward the edges of the radiation distribution 27 on both sides of the vertical central plane VV. In this regard, the optical exit-deflection element 18 comprises at least one optics 22, 23, which broadens the infrared radiation 11 emitted by the radiation source 10 to form a radiation beam 24 with an enlarged cross section 25 in the horizontal plane HH, and a radiation distribution 26, which has two intensity maximums 27 toward the edges of the radiation distribution 26 on each side of the vertical plane VV when viewed in the focal plane 21 of the light emission optics 16. Regions having the same intensity are indicated in the radiation distribution 26 shown in FIG. 4 by so-called isolux lines. The intensity of the radiation distribution 26 is lowest at the center, and increases toward the two intensity maximums 27. The intensity curve preferably corresponds to a section along the horizontal plane HH of the inverse scattering cross section of an object 14 that is illuminated at the respective angle. In the example shown in FIG. 3, the optical exit-deflection element 18 has a first optics 22, which broadens the infrared radiation 11 emitted by the radiation source 10 to form an intermediate beam 28, and a further optics 23, which focuses the intermediate beam 28 to form the radiation beam 24.

Starting from the center, the intensity increases toward the edges in the radiation distribution 26 along the horizontal plane HH. The increase in intensity is such that the back scattering cross section from illuminated objects, such as the object 14, decreasing toward the edges, can at least in part be compensated for. This has the advantage that objects 14 located diagonally in front of the vehicle on the side of the intensity maximum 27 of the radiation distribution 26 can be better detected, or just as well as objects 14 that are located in front of the vehicle, in the center of the radiation distribution 26.

Optics 29 adjusted to the respective emitted radiation cone are likewise located in front of the infrared radiation detector 13 for an optimal detection by the LiDAR system 10, 13, 18, which make it possible to obtain a corresponding, nearly equivalent reception cone.

Figure 5:
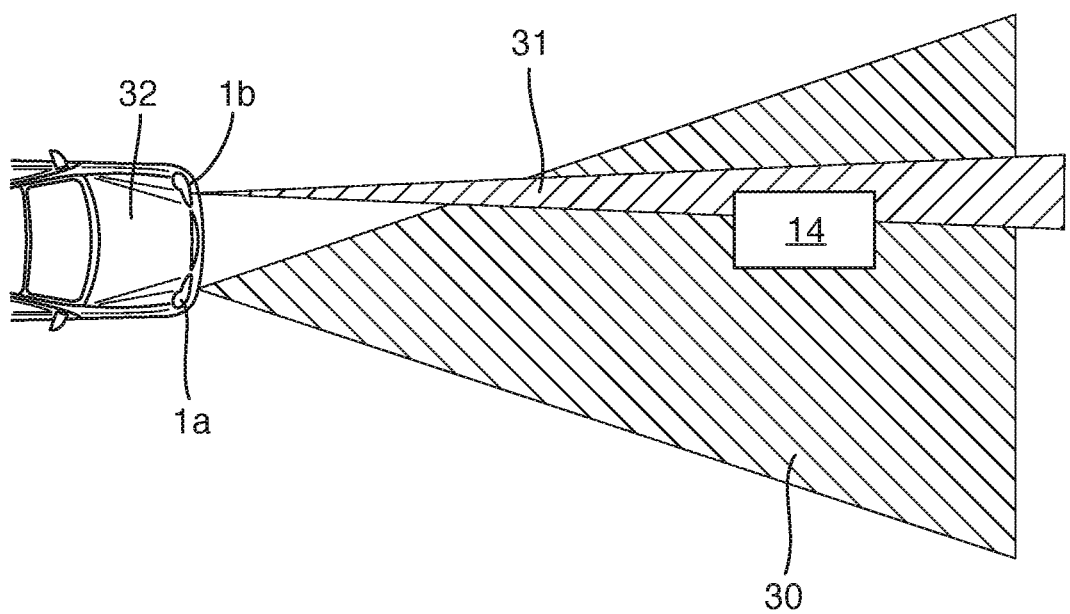
FIG. 5 shows an exemplary embodiment of detection cones from infrared detectors of the LiDAR system of the headlamp in a motor vehicle headlamp assembly according to the invention.
Figure 6:
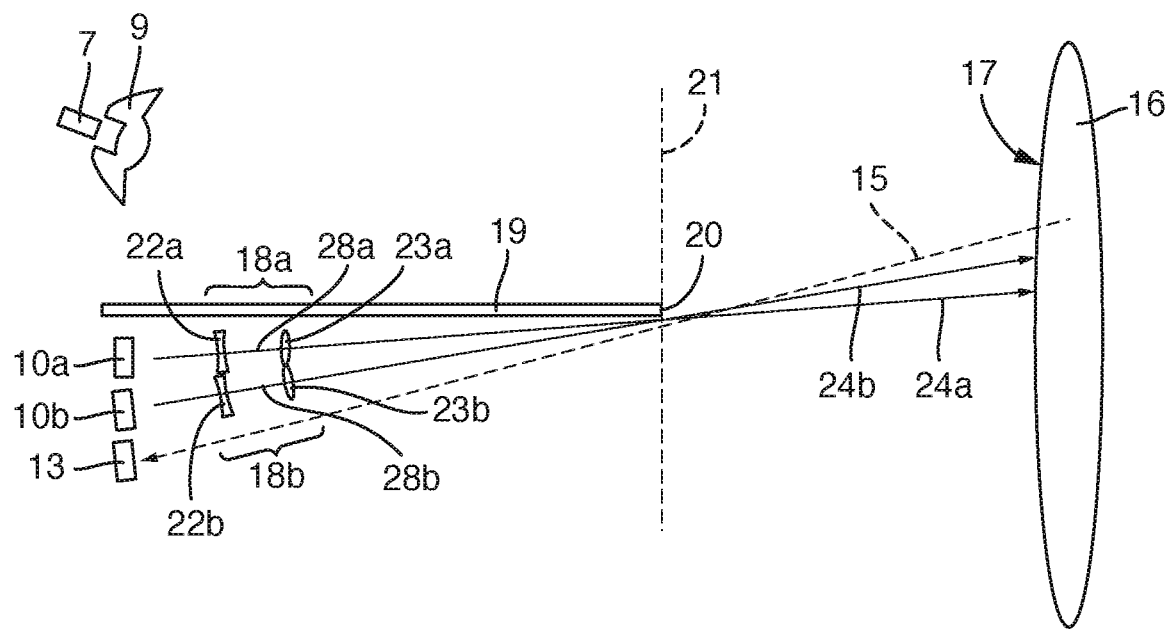
FIG. 6 shows another exemplary embodiment of a light module of the headlamp in FIG. 1.

In order to compensate for a reduced range with a wide reception cone, it is advantageous to combine LiDAR systems 10, 13, 18 that have different detection cones for the infrared radiation detectors 13 in the two headlamps 1 of the motor vehicle 32 (cf. FIG. 5). Thus, by way of example, the infrared detector 13 in one headlamp 1a may have a very broad detection cone 30, such that it can detect more effectively at close range. The infrared detector 13 in the other headlamp 1b can have a narrower detection cone 31, with a long range, such that it can detect objects 14 at greater distances. The headlamp 1a that has the broad detection cone 30 of the infrared radiation detector 13 is preferably installed in the vehicle on the right, such that objects 14 on the edge of the roadway can be better detected in right-hand traffic.

Alternatively to the embodiment shown in FIG. 5, it is also conceivable for the LiDAR system 10, 13, 18 with the narrower detection cone 31 to be installed in the right-hand headlamp 1a, and for the LiDAR system 10, 13, 18 with the broad detection cone 30 for close range to be installed in the left-hand headlamp 1b. This embodiment is shown by way of example in FIGS. 10a and 10b. In this configuration, the focused cone 37 (cf. FIG. 10a) can also be used as a photo sensor for objects 14 that move in front of the vehicle 32 from the right-hand side of the roadway. The detection cone 31 is placed as far as possible toward the edge of the vehicle 32, with a beam cone that is as narrow as possible. Alternatively, the detection cone 38 used as a photo sensor can also be asymmetrical (cf. FIG. 10b), in order to be able to monitor a larger region in front of the vehicle 32 with the photo sensor. Instead of varying the detection cone 38, the radiation cone of the LiDAR sources 10, 18 of the right-hand headlamp 1a can also be varied accordingly, and the detection cone 38 can remain symmetrical.

According to another embodiment of the invention, the radiation sources 10 in the two headlamps 1a, 1b of a motor vehicle can be operated alternately, such that the infrared radiation detectors 13 in both headlamps 1a, 1b are each used. As a result, a precise determination of the positions of objects 14 (cf. FIG. 5) lying in both detection cones 30, 31 can be obtained by triangulation. The emission cones correspond substantially to the detection cones 30, 31 of the respective infrared radiation detectors 13 in the headlamps 1a, 1b. Thus, the object 14 (cf. FIG. 5) is only illuminated by the LiDAR source 10, 18 of the left-hand headlamp 1b that has the narrower emission cone 31, wherein the reflected infrared signal 15 can be received by the infrared detectors 13 of both headlamps 1a, 1b, which have the detection cones 30, 31. Alternatively, it can also be concluded from the overlapping of the detection cones 30, 31 that objects 14 recorded by both detection cones 30, 31 are located directly in front of the vehicle 32.

If there is enough space in the light module 6, or in the headlamp housing 2, different emission cones (radiation beams 24) can also be implemented in a module 6 in that, by way of example, a plurality of radiation sources 10 with different optical exit-deflection elements 18 that have different beam broadenings are installed therein. Such an embodiment is shown by way of example in FIG. 6. A LiDAR system 10, 13, 18 that has two radiation sources 10a, 10b is shown therein, wherein each of the radiation sources 10a, 10b has a dedicated optical exit-deflection element 18a, 18b. Each of the optical exit-deflection elements 18a, 18b comprises a first optics 22a, 22b for broadening the beam, and a further optics 23a, 23b for focusing the broadened intermediate radiation beam. The broadened radiation beams from the two radiation sources 10a, 10b, or the radiation distributions 26 thereof, differ in terms of their shape. It would be conceivable for both radiation distributions 26 to have two intensity maximums 27 on each side of the vertical plane VV, wherein the maximums 27 of the two radiation distributions 26 are disposed at different locations in the horizontal plane HH. Alternatively, the two radiation distributions 26 could also have just one intensity maximum 27, wherein the maximums 27 of the two radiation distributions 26 are located on different sides of the vertical plane VV.

Figure 7:
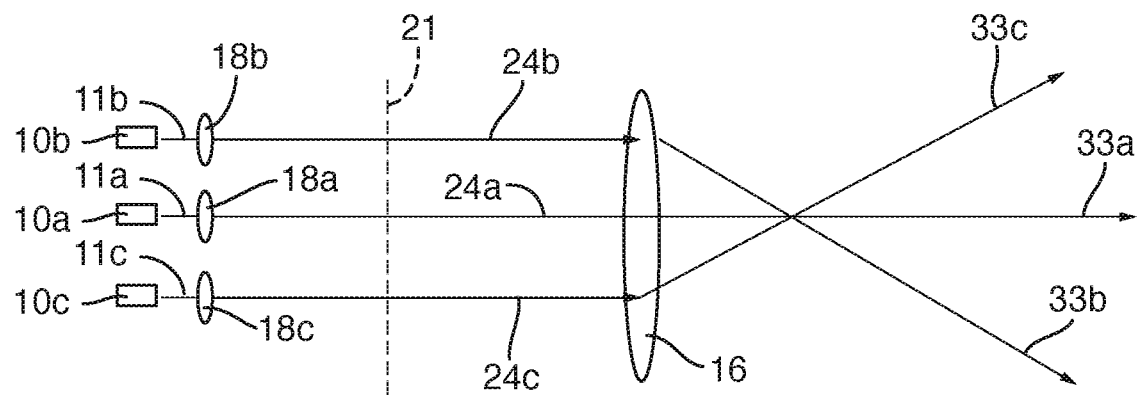
FIG. 7 shows another exemplary embodiment of a LiDAR system of the light module in FIG. 6.

According to another embodiment, shown in FIG. 7, a plurality of radiation sources 10a, 10b, 10c that have corresponding optical exit-deflection elements 18a, 18b, 18c can also be used for generating a combined radiation beam 24 that has the given radiation distribution 26. The individual radiation sources 10a, 10b, 10c, together with the dedicated optical exit-deflection elements 18a, 18b, 18c, each generate a portion 24a, 24b, 24c of a collectively broadened radiation beam 24 that has the two outlying intensity maximums 27. The radiation sources 10a, 10b, 10c can preferably be activated individually, depending on the driving circumstances of the vehicle. In this manner, the appropriate radiation sources 10a, 10b, 10c can be used, depending on the driving circumstances, in order to preferably illuminate the respective region of the radiation distribution 26, e.g. the radiation source 10b when turning to the right, which generates a portion 24b of the radiation distribution 26 adjacent to a cornering light, illuminating an angular range 33b. Accordingly, the radiation source 10a can be used for driving straight ahead, and the radiation source 10c can be used for turning left.

Figure 8:
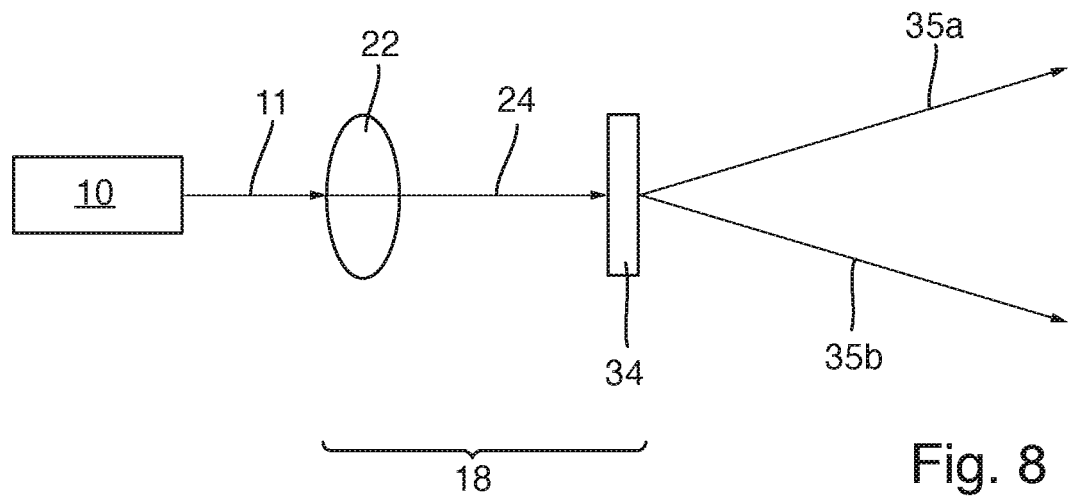
FIG. 8 shows another exemplary embodiment of a LiDAR system of the light module in the headlamp in FIG. 1.
Figure 9:
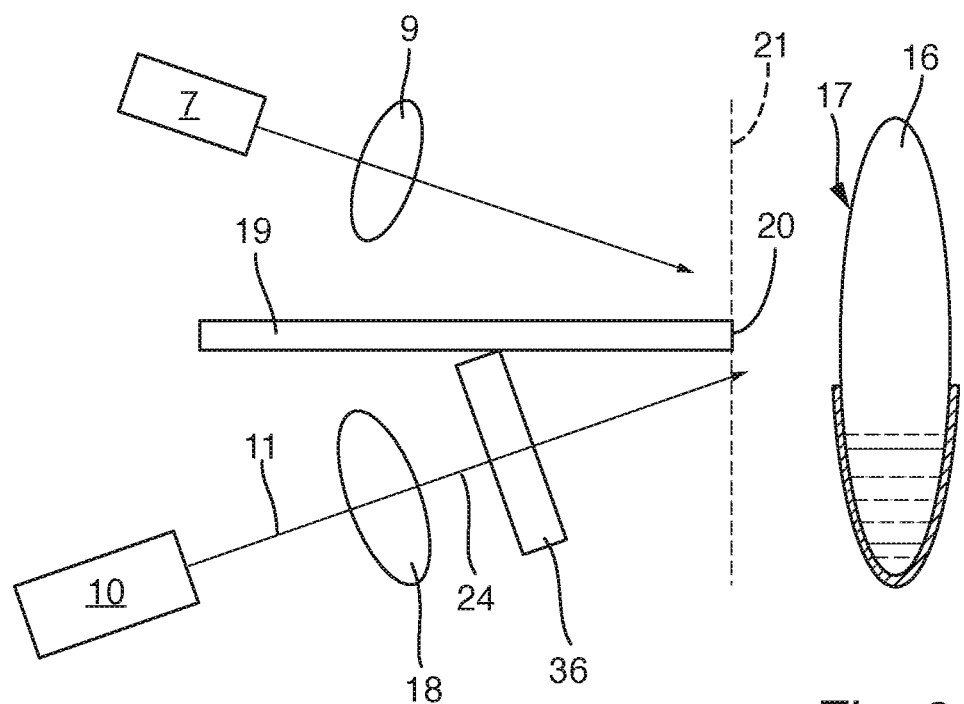
FIG. 9 shows another exemplary embodiment of a light module of the headlamp in FIG. 1.
Figure 10A:
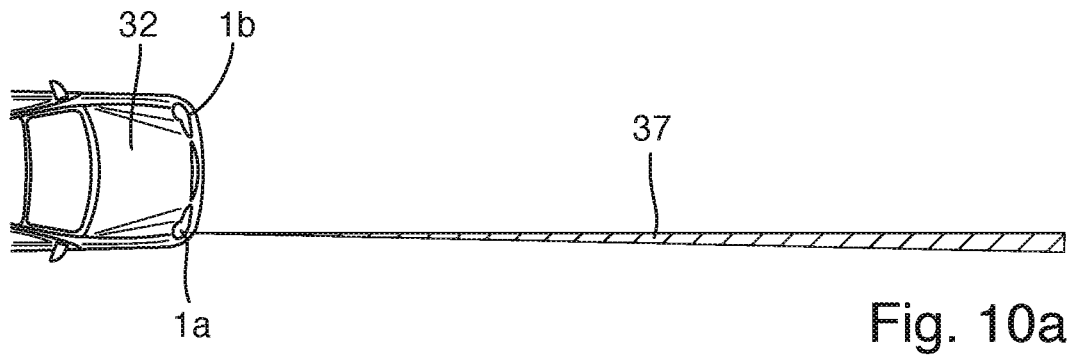
FIGS. 10a and 10b show exemplary embodiments of radiation cones of the LiDAR system of the headlamp in a motor vehicle headlamp assembly according to the invention.
Figure 10B:
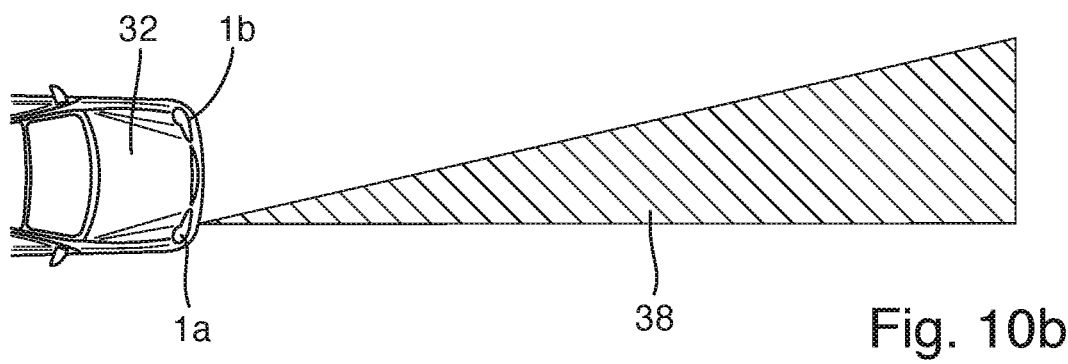

According to the embodiment shown in FIG. 8, the optical exit-deflection element 18 comprises a downstream binary diffraction grating 34 disposed in the beam path of the at least one optics 22, 23, which divides the radiation beam 24 emitted from the at least one optics 22, 23 into two subsidiary radiation beams 35a, 35b, each of which generates one of the intensity maximums 27 of the radiation distribution 26. When the two subsidiary radiation beams 35a, 35b are superimposed on one another, this corresponds basically to the radiation distribution 26 shown in FIG. 4.

For integration in a light module 6, the desired radiation distribution 26 (e.g. that shown in FIG. 4) is projected with a free-form optics or a hologram 36 into the focal plane 21 of the light emission optics 16. This illustrated by way of example in FIG. 9.

It is of particular advantage for a headlamp 1 that is used for the close range (e.g. the right-hand headlamp 1a in FIG. 5), it is advantageous when the detector has a plurality of infrared radiation detectors 13, instead of just one infrared radiation detector 13, which are spatially separated from one another, and detect only the reflected infrared radiation 15 from a specific angular range and generating a corresponding sensor signal. Distance and directional information can be obtained from the sensor signals from a plurality of infrared radiation detectors 13.

Lastly, it is also conceivable for the at least one radiation source 10, the at least one optical exit-deflection element 18, and the at least one infrared radiation detector 13 of a headlamp 1 to be disposed on a shared support frame, which is movably supported in the housing 2 of the headlamp 1. It is also conceivable that the at least one light source 7 for emitting visible light is also disposed on the support frame, and is pivoted collectively with the LiDAR system 10, 13, 18. The light emission optics 16 with its light entry surface 17 is also preferably disposed on the support frame. Thus, the entire light module 6 is disposed on the support frame and pivoted therewith. As a result, the LiDAR measurement can follow a curve in the roadway. This is particularly advantageous with a focused radiation cone, or a focused detection cone 31, 37 for long range detection. In particular when integrated in the LiDAR system 10, 13, 18 in a high beam module on a collective pivotal frame, the entire high beam module can be pivoted, if the high beam is not activated, thus enabling a scanning of the region in front of the vehicle. As a result, an angle-resolved LiDAR measurement can be implemented. Furthermore, this would also be possible with an integration of the LiDAR system 10, 13, 18 in a low beam light module. The low beam light module is frequently already mounted on a pivotal frame for a dynamic cornering light function, which is provided for pivoting the light module horizontally. This functionality can also be exploited in order to pivot the LiDAR system 10, 13, 18.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A motor vehicle headlamp assembly comprising at least one headlamp including a light source for emitting visible light, at least one radiation source for emitting infrared radiation, and one light emission optics with a light entry surface, on which visible light from the light source and infrared radiation from the at least one radiation source is incident, and which headlamp has at least one optical exit-deflection element, which directs the infrared radiation from the at least one radiation source toward the light entry surface of the light emission optics, wherein the optical exit-deflection element including at least one optics, which broadens the infrared radiation emitted by the at least one radiation source to form a radiation beam with an enlarged cross section in the horizontal plane (HH), and a radiation distribution, which has at least one intensity maximum located toward the edge of the radiation distribution to one side of a vertical plane (VV) when viewed in a focal plane of the light emission optics, wherein said at least one headlamp has a plurality of radiation sources, a plurality of optical exit-deflection elements and at least one infrared radiation detector, wherein one of the optical exit-deflection elements is dedicated to one of the radiation sources, and each of the radiation sources generates, together with the dedicated optical exit-deflection element, its own broadened radiation beam with at least one outlying intensity maximum, and wherein the radiation beams from the different radiation sources are each broadened to different extents, and wherein said at least one infrared radiation detector detects infrared radiation that has been emitted and then reflected by an object in front of the motor vehicle, and generates a corresponding sensor signal.

2. The motor vehicle headlamp assembly as set forth in claim 1, wherein the at least one infrared radiation detector measures the run time of a received infrared radiation pulse from the infrared radiation source to a person located in front of the motor vehicle in which the headlamp is installed, or to an object located in front of the vehicle, and returning from the person or object to the at least one infrared radiation detector.

3. The motor vehicle headlamp assembly as set forth in claim 2, wherein the at least one infrared radiation detector measures the signal strength of the received infrared radiation pulse.

4. The motor vehicle headlamp assembly as set forth in claim 1, wherein the at least one radiation source emits pulsed infrared radiation.

5. The motor vehicle headlamp assembly as set forth in claim 1, wherein the at least one headlamp has a plurality of infrared radiation detectors, each of which detects infrared radiation striking the infrared radiation detector in a specific angular range, emitted by at least one of the radiation sources of the motor vehicle headlamp assembly, that has been reflected by an object in front of the motor vehicle, and to generate a corresponding sensor signal.

6. The motor vehicle headlamp assembly as set forth in claim 1, wherein the at least one headlamp installed in a motor vehicle has an imaginary horizontal central plane, comprising a shutter element of the headlamp, which is mapped by the light emission optics as a light/dark boundary on a roadway in front of the motor vehicle, wherein a light module for generating a low beam light distribution is disposed above the central plane, and the at least one radiation source and at least one infrared radiation detector are disposed below the central plane.

7. The motor vehicle headlamp assembly as set forth in claim 1, wherein the, or each, optical exit-deflection element comprises at least one optics, which broadens the infrared radiation emitted by the at least one radiation source to form a radiation beam with a broadened cross section in a horizontal plane (HH), and a radiation distribution that has two intensity maximums located toward the edges in the radiation distribution and on both sides of the vertical plane (VV).

8. The motor vehicle headlamp assembly as set forth in claim 1, wherein said at least one optical exit-deflection element has a first optics, which broadens the infrared radiation emitted by the at least one radiation source to form an intermediate beam, and a further optics, which focuses the intermediate beam with the at least one outlying intensity maximum to form the radiation beam.

9. The motor vehicle headlamp assembly as set forth in claim 1, wherein the, or each, optical exit-deflection element has a downstream diffraction grating disposed in the beam path of the at least one optics, which divides the radiation beam emitted by the at least one optics into two subsidiary radiation beams, which collectively generate the radiation distribution, wherein each of the subsidiary radiation beams generates one of the intensity maximums.

10. The motor vehicle headlamp assembly as set forth in claim 1, wherein the at least one radiation source including an optical exit-deflection element for generating a focused radiation beam is disposed in the left-hand headlamp, and a radiation source including an optical exit-deflection element for generating the radiation beam broadened in the horizontal plane (HH) is disposed in the right-hand headlamp.

11. The motor vehicle headlamp assembly as set forth in claim 1, wherein at least one infrared radiation detector of the left-hand headlamp has a dedicated optics designed to create a focused detection cone, and the at least one infrared radiation detector of the right-hand headlamp has a dedicated optics designed to create a detection cone broadened in the horizontal plane (HH).

12. The motor vehicle headlamp assembly as set forth in claim 1, wherein a radiation source with a dedicated optical exit-deflection element for generating a focused radiation beam is disposed in the right-hand headlamp, and a radiation source with a dedicated optical exit-deflection element for generating the radiation beam broadened in the horizontal plane (HH) is disposed in the left-hand headlamp.

13. The motor vehicle headlamp assembly as set forth in claim 1, wherein at least one infrared radiation detector of the left-hand headlamp has a dedicated optics designed to create a focused detection cone and the at least one infrared radiation detector of the right-hand headlamp has a dedicated optics designed to create a detection cone broadened in the horizontal plane (HH).

14. The motor vehicle headlamp assembly as set forth in claim 1, wherein each headlamp has a plurality of radiation sources and a plurality of optical exit-deflection elements, wherein one of the optical exit-deflection elements is dedicated to one of the radiation sources in each case, and each of the radiation sources, interacting with its dedicated optical exit-deflection element, generates a part of a collectively broadened radiation beam with the at least one outlying intensity maximum, wherein each part of the radiation beam illuminates a specific angular range.

15. The motor vehicle headlamp assembly as set forth in claim 1, wherein, with a plurality of radiation sources for each headlamp, the radiation sources can be activated depending on the driving circumstances of the motor vehicle.

16. The motor vehicle headlamp assembly as set forth in claim 1, wherein the motor vehicle headlamp assembly comprises two headlamps, disposed on different sides of the motor vehicle, wherein the optical exit-deflection elements of the two headlamps are designed to broaden the infrared radiation emitted by the at least one radiation source of the one headlamp to form a radiation beam with a cross section broadened in a horizontal plane (HH) and a radiation distribution, which has an intensity maximum disposed toward the edge of the radiation distribution on a first side of the vertical plane (VV) when viewed in a focal plane of the light emission optics, and to broaden the infrared radiation emitted by the at least one radiation source in the other headlamp to form a radiation beam with a cross section broadened in a horizontal plane (HH) and an asymmetrical beam distribution, which has an intensity maximum disposed toward the edge of the radiation distribution on the other side of the vertical plane (VV) when viewed in a focal plane of the light emission optics.

17. The motor vehicle headlamp assembly as set forth in claim 1, wherein each of the radiation sources of a headlamp forms a LiDAR source with the dedicated optical exit-deflection element.

18. The motor vehicle headlamp assembly as set forth in claim 1, wherein each headlamp has a hologram, which projects the radiation distribution of the at least one broadened radiation beam into the focal plane of the light emission optics.

19. The motor vehicle headlamp assembly as set forth in claim 1, wherein the motor vehicle headlamp assembly comprises two headlamps, which are disposed on different sides of the motor vehicle, wherein the at least one radiation source of the one headlamp can be operated alternating with the at least one radiation source of the other headlamp, and infrared radiation detectors of both headlamps detect infrared radiation reflected by the object, and convey this information to a further evaluation.

20. The motor vehicle headlamp assembly as set forth in claim 1, wherein a light module for generating a light distribution with visible light and a radiation module for generating the radiation distribution with the infrared radiation are disposed on a collective support frame which is movably supported in a housing of the headlamp.

* * * * *